(12) United States Patent
Manoranjith et al.

(10) Patent No.: US 12,314,249 B2
(45) Date of Patent: May 27, 2025

(54) DEVICE FOR CARRYING OUT TRANSACTIONS AND OPERATING METHOD THEREFOR

(71) Applicant: Robert Bosch GmbH, Stuttgart (DE)

(72) Inventors: Arunachalam Ponnuraj Manoranjith, Tamil Nadu (IN); Christian Hoeppler, Backnang (DE); Daniel Kunz, Erdmannhausen (DE); Sukumaran Anagha Kunnekattukara, Kerala (IN)

(73) Assignee: ROBERT BOSCH GMBH, Stuttgart (DE)

( * ) Notice: Subject to any disclaimer, the term of this patent is extended or adjusted under 35 U.S.C. 154(b) by 514 days.

(21) Appl. No.: 17/349,092

(22) Filed: Jun. 16, 2021

(65) Prior Publication Data
US 2022/0004541 A1    Jan. 6, 2022

(30) Foreign Application Priority Data
Jul. 3, 2020  (DE) .......................... 102020208342.8

(51) Int. Cl.
*G06F 16/23*     (2019.01)
*G06F 16/27*     (2019.01)

(52) U.S. Cl.
CPC .......... *G06F 16/2379* (2019.01); *G06F 16/27* (2019.01); *G06F 16/273* (2019.01); *G06F 16/275* (2019.01); *G06F 16/278* (2019.01)

(58) Field of Classification Search
CPC .... G06F 16/2379; G06F 16/27; G06F 16/273; G06F 16/275; G06F 16/278
See application file for complete search history.

(56) References Cited

U.S. PATENT DOCUMENTS

| | | | |
|---|---|---|---|
| 2018/0191714 A1* | 7/2018 | Jentzsch | H04L 9/3247 |
| 2019/0208422 A1* | 7/2019 | Haleem | H04L 9/3247 |
| 2019/0310900 A1* | 10/2019 | Lee | H04L 9/3239 |
| 2019/0370813 A1* | 12/2019 | Bravick | G06Q 20/223 |
| 2020/0005282 A1* | 1/2020 | Kim | G06Q 20/3672 |

OTHER PUBLICATIONS

Dziembowski et al., "General State Channel Networks," ACM SIGSAC Conference on Computer and Communications Security (CCS'18), Association for Computing Machinery, 2018, pp. 1-66. <https://eprint.iacr.org/2018/320.pdf> Downloaded Jun. 14, 2021.

Dziembowski et al.,"Perun: Virtual Payment Hubs Over Cryptocurrencies," IEEE Symposium on Security and Privacy (SP), 2019, pp. 1-19. <https://eprint.iacr.org/2017/635.pdf> Downloaded Jun. 14, 2021.

Nakamoto, "Bitcoin: A Peer-to-Peer Electronic Cash System," Bitcoin Org., 2009, pp. 1-9. <https://bitcoin.org/bitcoin.pdf> Downloaded Jun. 14, 2021.

McCorry et al., "Pisa: Arbitration Outsourcing for State Channels," 1ST ACM Conference on Advances in Financial Technologies (AFT '19), Association for Computing Machinery, 2019, pp. 1-20. <https://eprint.iacr.org/2018/582.pdf> Downloaded Jun. 14, 2021.

\* cited by examiner

*Primary Examiner* — Kavita Stanley
*Assistant Examiner* — Lin Lin M Htay
(74) *Attorney, Agent, or Firm* — NORTON ROSE FULBRIGHT US LLP

(57) ABSTRACT

A method, in particular, a computer-implemented method, for operating a device. The device is designed to carry out transactions via at least one state channel associated with a distributed ledger technology (DLT) system.

24 Claims, 9 Drawing Sheets

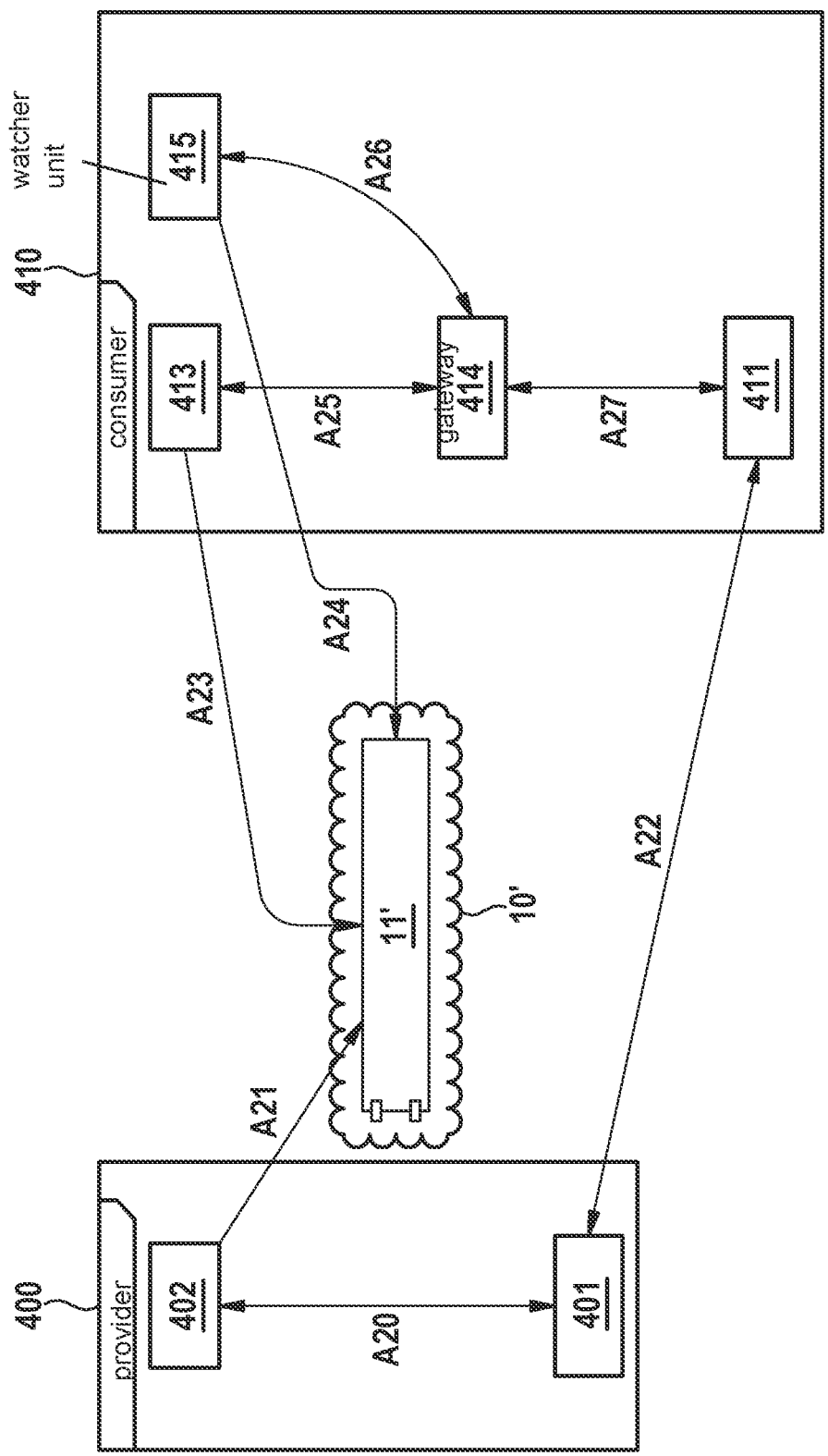

DEVICE FOR CARRYING OUT TRANSACTIONS AND OPERATING METHOD THEREFOR

CROSS REFERENCE

The present application claims the benefit under 35 U.S.C. § 119 of German Patent Application No. DE 102020208342.8 filed on Jul. 3, 2020, which is expressly incorporated herein by reference in its entirety.

FIELD

The present invention relates to a, in particular, computer-implemented method for operating a device, which is designed to carry out transactions via at least one state channel associated, for example, with a distributed ledger technology, DLT, system.

The present invention relates to a device for carrying out transactions via at least one state channel.

SUMMARY

Exemplary specific embodiments of the present invention relate to a method, in particular, to a computer-implemented method, for operating a device, which is designed to carry out transactions via at least one state channel associated, for example, with a distributed ledger technology, DLT, system. In accordance with an example embodiment of the present invention, the method includes: transmitting a first message to at least one further device, the first message prompting the at least one further device to establish a state channel for the device, receiving a second message from the at least one further device, the second message signaling that the state channel for the device has been established, carrying out at least one transaction via the state channel. This enables the implementation of transactions via the state channel in further exemplary specific embodiments, for example, without the device for carrying out the transactions itself establishing the state channel. As a result, in further exemplary specific embodiments, devices of the type which, for example, include a comparatively low computing power and/or communication bandwidth and/or comparatively few memory resources, or are not able to regularly carry out a data communication with further devices, are also able to utilize the state change for carrying out transactions.

In further exemplary specific embodiments of the present invention, the state channel enables an exchange of states or pieces of information characterizing states between at least two parties, in particular, without using a or the DLT system. Thus, different states or corresponding pieces of information may be comparatively rapidly exchanged without corresponding transactions of the DLT system being necessary for such purpose. Thus, the transactions carried out via the state channel in further exemplary specific embodiments may also be referred to as "off-chain" transactions.

In further exemplary specific embodiments of the present invention, at least one state channel as it is described, for example, in the following cited (Reference 2), may, for example, be used to carry out transactions.

The following cited documents (Reference 1) and (Reference 2) are expressly incorporated herewith into the present description.

Stefan Dziembowski, Sebastian Faust, and Kristina Hostáková. 2018, "General State Channel Networks," in Proceedings of the 2018 ACM SIGSAC Conference on Computer and Communications Security (CCS '18), Association for Computing Machinery, New York, NY, USA, 949-966. DOI:https://doi.org/10.1145/3243734.3243856 (Reference 1).

S. Dziembowski, L. Eckey, S. Faust, and D. Malinowski, "Perun: Virtual Payment Hubs over Cryptocurrencies," 2019 *IEEE Symposium on Security and Privacy (SP)*, San Francisco, CA, USA, 2019, pp. 106-123, doi:10.1109/SP.2019.00020 (Reference 2).

In further exemplary specific embodiments of the present invention, for example, signed, transactions and or pieces of status information and/or status updates may be transferred via the state channel, for example, between a prospective consumer of a resource and a provider of the resource or between corresponding devices.

In further exemplary specific embodiments of the present invention, comparatively numerous (for example, signed) transactions per time may be transferred via the state channel, so that a request and/or provision of resources may accordingly dynamically take place.

In further exemplary specific embodiments of the present invention, the state channel may, for example, be a so-called ledger channel, which is implementable, for example, with the aid of a DLT system.

In further exemplary specific embodiments of the present invention, it is provided that the DLT system includes at least one blockchain and/or at least one directed acyclic graph (DAG).

In further exemplary specific embodiments of the present invention, the blockchain may be understood as a concatenated list of data blocks, which are linked to one another using cryptographic methods (for example, forming a hash value of the respective data block), for example, according to the Merkle-Baum principle. In this way, a forgery-proof storage of data in the blockchain is possible.

In further exemplary specific embodiments of the present invention, the blockchain may be implemented in the form of a distributed or decentralized database, multiple network elements ("nodes") of a blockchain network each storing data blocks of the blockchain. Fundamental aspects of the blockchain technology are described, for example, in the following paper: Nakamoto, Satoshi, (2009). "Bitcoin: A Peer-to-Peer Electronic Cash System," https://bitcoin.org/bitcoin.pdf.

In further exemplary specific embodiments of the present invention, a DLT or the blockchain may store one or multiple smart contracts, which make it possible, for example to store pieces of information, for example, also in connection with the establishment of the state channel according to exemplary specific embodiments, but also to carry out queries and further program functions, similar to a programmer language, for example based on pieces of information stored in the blockchain and/or transactions carried out relating to the blockchain. In this way, in further exemplary specific embodiments, logical links corresponding to contractual regulations and/or pieces of information characterizing a utilization of the resource etc. may be stored in the blockchain with the aid of one or of multiple smart contracts.

In further exemplary specific embodiments, it is provided that the first message is sent directly from a device carrying out the method, i.e., for example, from the device for carrying out transactions, to the at least one further device.

In further exemplary specific embodiments of the present invention, it is provided that the first message is sent from a device carrying out the method, i.e., for example, from the device for carrying out transactions, to the at least one further device via at least one further device or unit, for example, via a gateway, which receives the first message from the device for carrying out transactions and then sends or forwards the first message to the at least one further device.

In further exemplary specific embodiments of the present invention, this applies accordingly also to one or to multiple further messages, as they are described by way of example below.

In further exemplary specific embodiments of the present invention, it is provided that the method further includes: establishing an initial state, for example, for future transactions via the state channel, the first message being formed, for example, based on the initial state.

In further exemplary specific embodiments of the present invention, the establishment of the initial state includes a negotiation of conditions for future transactions, the conditions being able to be stipulated, for example, with the aid of a contract, for example a digital contract, for example, a smart contract. In further exemplary specific embodiments, the smart contract is, for example, incorporated in the DLT system, for example, in a blockchain of the DLT system.

In further exemplary specific embodiments of the present invention, it is provided that the method further includes: sending a third message to the at least one further device, the third message prompting the at least one further device to initialize a watcher unit, which is designed to monitor the DLT system, for example, repeatedly, for example, periodically for predefinable events, for example, for events relating to the state channel for the device. This may be advantageous, for example, if the device for carrying out the transactions temporarily has no data connection, and is thus unable, for example, to receive any status updates via the state channel.

In further exemplary specific embodiments of the present invention, the watcher unit is configured, for example, according to the following cited (Reference 3), which is expressly incorporated herewith into the present description.

Patrick McCorry, Surya Bakshi, Iddo Bentov, Sarah Meiklejohn, and Andrew Miller. 2019, "Pisa: Arbitration Outsourcing for State Channels," in Proceedings of the 1st ACM Conference on Advances in Financial Technologies (AFT '19). Association for Computing Machinery, New York, NY, USA, 16-30, DOI:https://doi.org/10.1145/3318041.3355461, (Reference 3).

In further exemplary specific embodiments of the present invention, it is provided that the third message is contained in the first message, for example, combined with the first message.

In further exemplary specific embodiments of the present invention, it is provided that the method further includes: sending pieces of timing information to the at least one further device, the pieces of timing information characterizing a time behavior of the device with respect to transactions to be carried out via the state channel, the pieces of timing information including, for example, an updating interval, within which the device, for example, a or the watcher unit provides information about a new state. In this way, the at least one further device is able to initialize the watcher unit temporally matching the updating interval, i.e., to adapt the operation of the watcher unit to the time behavior of the device for carrying out the transactions.

In further exemplary specific embodiments of the present invention, it is provided that the pieces of timing information are sent with or after the first message to the at least one further device.

In further exemplary specific embodiments of the present invention, it is provided that the method further includes: sending pieces of state information characterizing an instantaneous state, for example, to the watcher unit. In this way, the watcher unit may be informed regarding an instantaneous state of transactions via the state channel and, for example, to adjust its operation accordingly.

In further exemplary specific embodiments of the present invention, it is provided that the method further includes: sending a fourth message to the at least one further device, the fourth message prompting the at least one further device to remove the state channel. Thus, the removal of the state channel from the at least one further device, for example, for the device for carrying out the transactions, may also be carried out, which further relieves the device for carrying out the transactions.

In further exemplary specific embodiments of the present invention, it is provided that the at least one further device is designed to carry out transactions on the DLT system, for example, a) to establish a or the state channel for the device, b) to remove a or the state channel for the device, c) to initialize a or the watcher unit, for example, based on pieces of timing information or on the pieces of timing information that characterize a time behavior of the device with respect to transactions to be carried out via the state channel. The at least one further device may, for example, thereby carry out steps of managing the state channel and thereby, for example, "relieve" the device for carrying out transactions so that the device for carrying out the transactions in further exemplary specific embodiments does not have to maintain the corresponding computing time or other resource expenditure. In further exemplary specific embodiments, the complexity of the device for carrying out the transactions may be reduced as a result.

Further exemplary specific embodiments of the present invention relate to a device for carrying out transactions via at least one state channel associated, for example, with a distributed ledger technology, DLT, system, the device for carrying out the method in accordance with the present invention.

In further exemplary specific embodiments of the present invention, it is provided that the device is designed as an Internet-of-Things device, the device being designed, for example, to carry out transactions via, for example, an already existing state channel, the device being designed, for example, to directly access a or the DLT system. In further exemplary specific embodiments, accesses to the DLT system, for example, for establishing and/or disassembling the state channel may be carried out by the at least one further device.

In further exemplary specific embodiments of the present invention, it is provided that the device includes at least one sensor unit for ascertaining sensor data. The device may, for example, be designed as an IoT sensor device. In further exemplary specific embodiments, the IoT sensor device may utilize state channels for transactions, for example, the offering or selling of sensor data, for example, in terms of the Economy-of-Things, with the aid of the support by the at least one further device with respect to accesses to the DLT system, the IoT sensor device being able to establish and/or remove state channels, for example, and/or otherwise be managed by the at least one further device.

Further exemplary specific embodiments of the present invention relate to a method for managing a state channel associated, for example, with a distributed ledger technology, DLT, system for at least one device for carrying out transactions via the state channel, for example, for at least one device according to the specific embodiments, the method including: receiving a first message for example, from the device, the first message indicating that a state channel is to be established for the device, establishing the state channel, sending a second message to the device, the second message signaling that the state channel has been established.

In further exemplary specific embodiments of the present invention, it is provided that the method further includes: receiving a third message, for example, from the device, the third message indicating that a watcher unit is to be initialized, which is designed to monitor, the DLT system, for example, repeatedly, for example, periodically, for predefinable events, for example, for events relating to the state channel for the device and, optionally, initializing the watcher unit.

In further exemplary specific embodiments of the present invention, it is provided that the method further includes: receiving pieces of timing information, for example, from the device, the pieces of timing information characterizing a time behavior of the device with respect to transactions to be carried out via the state channel, the pieces of timing information including, for example, an updating interval, within which the device informs, for example, a or the watcher unit of a new state.

In further exemplary specific embodiments of the present invention, it is provided that the method further includes: receiving pieces of state information that characterize an instantaneous state, for example, from the device and, optionally, sending the received pieces of state information, for example, to the watcher unit.

In further exemplary specific embodiments of the present invention, it is provided that the method further includes: receiving a fourth message, for example, from the device, the fourth message indicating that the state channel is to be disassembled and, optionally, disassembling the state channel.

Further exemplary specific embodiments relate to a device for managing a state channel associated, for example, with a distributed ledger technology, DLT, system for at least one device for carrying out transactions via the state channel, for example, for at least one device according to the specific embodiments, the device being designed to carry out the method according to the specific embodiments of the present invention. In further exemplary specific embodiments of the present invention, the device for managing the state channel may also manage multiple state channels, for example, for a plurality or multitude of (IoT) devices for carrying out transactions via the state channel or state channels, and thereby relieve the (IoT) devices of comparatively computing-intensive and/or data communication-intensive processes such as, for example, the establishment and/or removal of state channels.

In further exemplary specific embodiments of the present invention, the device for managing the state channel or a corresponding functionality may be implemented, for example, on a mobile terminal such as, for example, a mobile telephone or laptop computer or also on a stationary device, for example, in the form of a software agent (computer program).

In further exemplary specific embodiments of the present invention, the device for managing the state channel or a corresponding functionality may be implemented, for example in the form of a wallet service, i.e., of a service, for example, that stores or manages private cryptographic keys for an access to a DLT system.

Further exemplary specific embodiments of the present invention relate to a system including at least one device for carrying out transactions according to the specific embodiments and at least one device for managing a state channel associated, for example, with a distributed ledger technology, DLT, system for at least one device for carrying out transactions, for example, for the at least one device for carrying out transactions.

In further exemplary specific embodiments of the present invention, it is provided that the system further includes at least one distributed ledger technology, DLT, system.

Further exemplary specific embodiments of the present invention relate to a computer-readable memory medium, including commands which, when executed by a computer, prompt the computer to carry out the method according to the specific embodiments.

Further exemplary specific embodiments of the present invention relate to a computer program, including commands which, upon execution of the program by a computer, prompt the computer to carry out the method according to the specific embodiments of the present invention.

Further exemplary specific embodiments of the present invention relate to a data carrier signal, which transfers and/or characterizes the computer program according to the specific embodiments of the present invention.

Further exemplary specific embodiments of the present invention relate to a use of the method according to the specific embodiments and/or of the device according to the specific embodiments and/or of the system according to the specific embodiments and/or of the computer-readable memory medium according to the specific embodiments and/or of the computer program according to the specific embodiments and/or of the data carrier signal according to the specific embodiments for at least one of the following elements: a) carrying out transactions, for example, off-chain transactions via at least one state channel associated, for example, with a distributed ledger technology, DLT system, b) managing at least one state channel associated, for example, with a distributed ledger technology, DLT system, c) enabling Internet-of-Things, IoT, devices to carry out transactions, for example, Economy-of-Things, EoT transactions via at least one state channel, d) managing at least one state channel associated, for example, with a distributed ledger technology, DLT, system for at least one IoT device, e) managing a watcher unit for at least one device for carrying out transactions via at least one state channel associated, for example, with a distributed ledger technology, DLT, system, for example, for at least one IoT device.

Further features, possible applications and advantages of the present invention result from the following description of exemplary embodiments of the present invention, which are represented in the figures. All features described or represented in this application, alone or in arbitrary combination, form the subject matter of the present invention, regardless of their wording or representation in the description or in the figures.

BRIEF DESCRIPTION OF THE DRAWINGS

FIG. 6 schematically shows a simplified block diagram according to further exemplary specific embodiments of the present invention.

DETAILED DESCRIPTION OF EXAMPLE EMBODIMENTS

Figure 1:
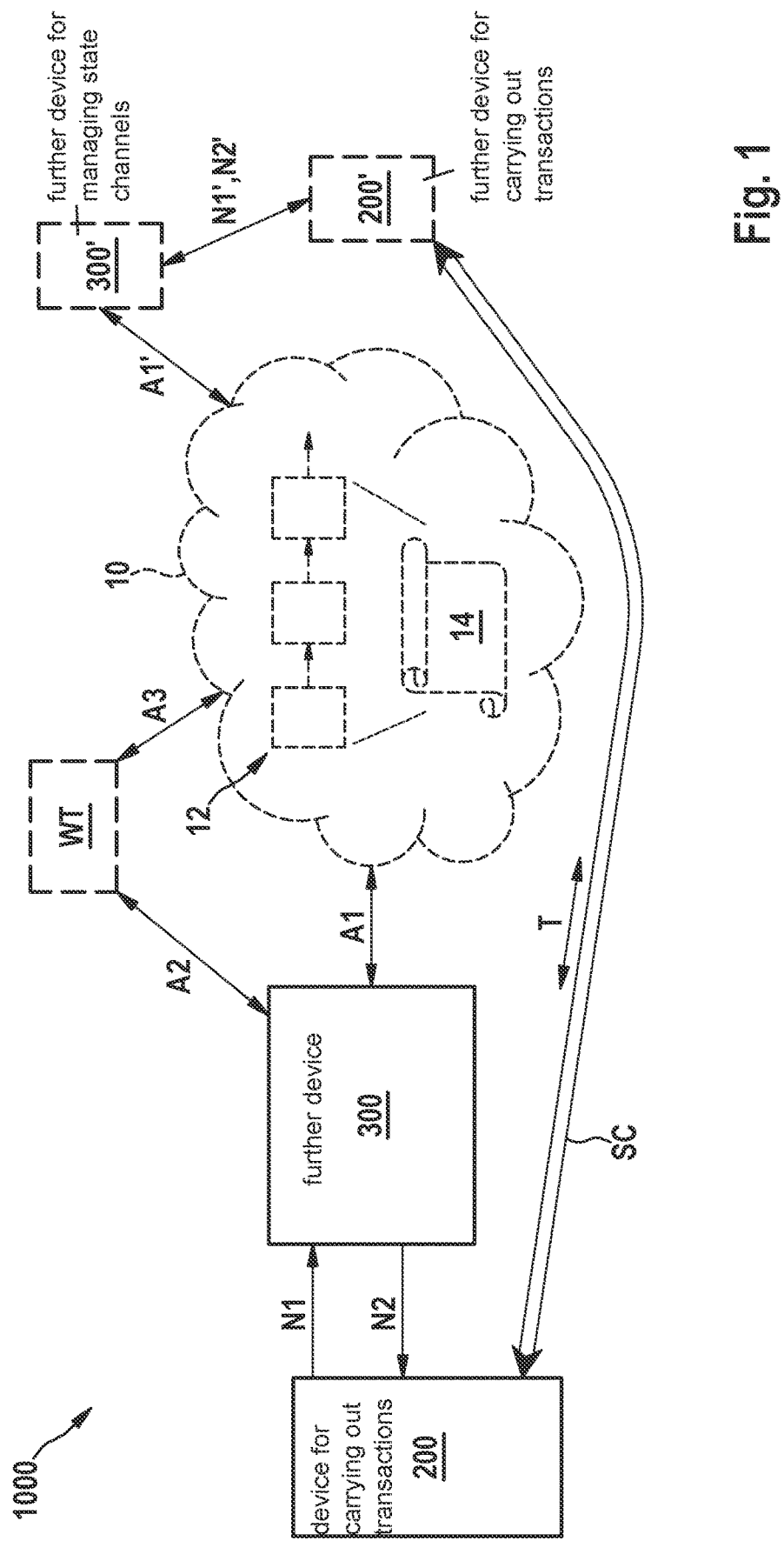
FIG. 1 schematically shows a simplified block diagram according to exemplary specific embodiments of the present invention.

FIG. 1 schematically shows a simplified block diagram according to exemplary specific embodiments of the present invention, a device 200 for carrying out transactions T via at least one state channel SC associated, for example, with a distributed ledger technology, DLT, system 10.

Figure 2:
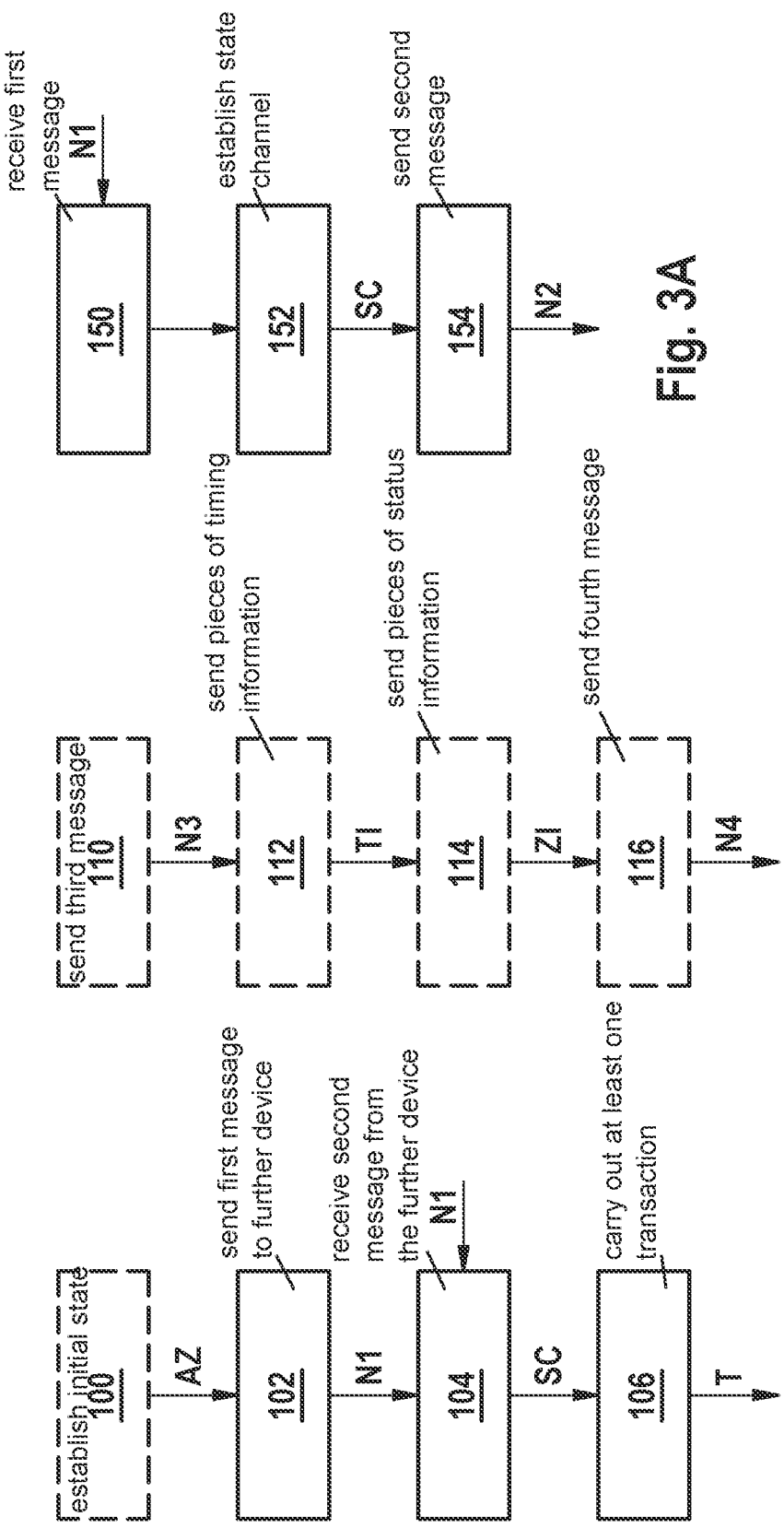
FIG. 2A schematically shows a simplified flowchart of methods according to further exemplary specific embodiments of the present invention.
FIG. 2B schematically shows a simplified flowchart of methods according to further exemplary specific embodiments of the present invention.

Further exemplary specific embodiments, cf. FIG. 2A, relate to a method, in particular, to a computer-implemented method, for operating device 200, the method including: sending 102 a first message N1 (cf. also FIG. 1, for example, directly or via another unit not shown in FIG. 1 such as, for example, a gateway) to at least one further device 300, first message N1 prompting the at least one further device 300 to establish a state channel SC for device 200, receiving 104 (FIG. 2A) a second message N2 from the at least one further device 300 (directly from the at least one further device or via another unit not shown in FIG. 1 such as, for example, a gateway), second message N2 signaling that state channel SC has been established for device 200, carrying out 106 (FIG. 2A) at least one transaction T via state channel SC. In further exemplary specific embodiments, this allows transactions T to be carried out via state channel SC without device 200 for carrying out transactions T itself establishing state channel SC. In this way, such devices 200 in further exemplary specific embodiments which, for example, have a comparatively low computing power and/or communication bandwidth and/or comparatively few memory resources, or which are unable to regularly carry out a data communication with further devices, and/or which for other reasons are temporarily unable or possibly able only to a limited extent to carry out steps to be carried out for establishing the state channel, are also able to utilize state channel SC for carrying out 106 transactions T.

In further exemplary specific embodiments, state channel SC enables an exchange of states or pieces of information characterizing states between at least two parties (for example, between a provider and a prospective consumer of a resource), in particular, without using a or the DLT system 10. Thus, different states or corresponding pieces of information are able to be comparatively rapidly exchanged via state channel SC, without requiring for such purpose corresponding transactions of DLT system 10, which potentially scale comparatively poorly. Thus, the transactions carried out via state channel SC may be referred to in further exemplary specific embodiments as "off-chain" transactions. In other words, device 200 in further exemplary specific embodiments may efficiently carry out a multitude of transactions T via state channel SC without itself carrying out the establishment or removal of state channel SC.

In further exemplary specific embodiments, at least one state channel SC, as it is described, for example, in the following cited (Reference 2), may be used for carrying out transactions T.

The following cited documents (Reference 1) and (Reference 2) are expressly incorporated herewith into the present description.

Stefan Dziembowski, Sebastian Faust, and Kristina Hostáková. 2018, "General State Channel Networks," in Proceedings of the 2018 ACM SIGSAC Conference on Computer and Communications Security (CCS '18). Association for Computing Machinery, New York, NY, USA, 949-966. DOI:https://doi.org/10.1145/3243734.3243856 (Reference 1).

S. Dziembowski, L. Eckey, S. Faust and D. Malinowski, "Perun: Virtual Payment Hubs over Cryptocurrencies," 2019 *IEEE Symposium on Security and Privacy (SP)*, San Francisco, CA, USA, 2019, pp. 106-123, doi: 10.1109/SP.2019.00020 (Reference 2).

In further exemplary specific embodiments, signed transactions, for example, and/or pieces of status information and/or status updates may be transferred via the state channel, for example, between a prospective consumer of a resource and a provider of the resource or between corresponding devices.

For example, a system 1000 (FIG. 1) according to exemplary specific embodiments may include devices 200, 300 and, optionally DLT system 10.

In further exemplary specific embodiments, system 1000 may also include at least one further device 200' for carrying out transactions T via state channel SC, and/or at least one further device 300' for managing state channels SC for device 200, 200'. In further exemplary specific embodiments, device 200' may have a configuration comparable or at least similar to device 200. In further exemplary specific embodiments, device 300' may, for example, have a configuration comparable or at least similar to device 300.

In further exemplary specific embodiments, comparatively numerous (for example, signed) transactions T per time may be transferred via state channel SC, for example, between devices 200, 200', so that a request and/or provision of resources implementable with the aid of transactions may correspondingly dynamically take place.

In further exemplary specific embodiments, state channel SC may, for example, be a so-called ledger channel, which is implementable with the aid of a or the DLT system 10 or is based on DLT system 10.

In further exemplary specific embodiments, it is provided that DLT system 10 includes at least one blockchain 12 and/or at least one directed acyclic graph, DAG, not shown.

In further exemplary specific embodiments, blockchain 12 may be understood as a concatenated list of data blocks, which are linked to one another using cryptographic methods (for example, forming a hash value of the respective data block), for example, according to the Merkle-Baum principle. In this way, a forgery-proof storage of data in the blockchain 12 is possible.

In further exemplary specific embodiments, blockchain 12 may be implemented in the form of a distributed or decentralized database, multiple network elements ("nodes") of a blockchain network each storing data blocks of blockchain 12. Fundamental aspects of the blockchain technology are described, for example, in the following publication: Nakamoto, Satoshi, (2009), "Bitcoin: A Peer-to-Peer Electronic Cash System," https://bitcoin.org/bitcoin.pdf.

In further exemplary specific embodiments, a DLT or blockchain 12 may store one or multiple smart contracts 14, which make it possible, for example to store pieces of information, for example, also in connection with the establishment of state channel SC according to exemplary specific embodiments, but also to carry out queries and further program functions, similar to a programmer language, for example, based on pieces of information stored in blockchain 12 and/or transactions T carried out relating to blockchain 12. In this way, in further exemplary specific embodiments, logical links corresponding to contractual regulations and/or pieces of information characterizing a utilization of resources etc. may be stored in blockchain 12 with the aid of one or of multiple smart contracts 14 or with respect to at least one smart contract 14, for example, so-called funding or anchor transactions, as they are usable in further exemplary specific embodiments for establishing state channel SC.

In further exemplary specific embodiments, it is provided that first message N1 is sent 102 directly from a device 200 carrying out the method, i.e., for example, from device 200 for carrying out transactions T, to the at least one further device 300.

In further exemplary specific embodiments, it is provided that first message N1 is sent 102 from a device 200 carrying out the method, i.e., for example, from device 200 for carrying out transactions T, to the at least one further device 300 via at least one further device (not shown in FIG. 1) or unit, for example, via a gateway, which receives first message N1 from device 200 and then sends or forwards first message N1 to the at least one further device 300.

In further exemplary specific embodiments, this applies accordingly also to one or to multiple further messages N2, N3, N4, TI, ZI, as they are described by way of example below.

In further exemplary specific embodiments, it is provided, cf. FIG. 2A, that the method further includes: establishing 100 an initial state AZ, for example, for future transactions T via state channel SC, first message N1 being formed, for example, based on initial state AZ.

In further exemplary specific embodiments, the establishment 100 of initial state AZ includes a negotiation of conditions for future transactions T, the conditions capable of being stipulated, for example, with the aid of a contract, for example a digital contract, for example, smart contract 14, for example, with the aid of the so-called anchor transaction, which is executable, for example, by device 300 on DLT system 10. In further exemplary specific embodiments, smart contract 14 is, for example, positioned in DLT system 10, for example, in a blockchain 12 of DLT system 10.

In further exemplary specific embodiments, it is provided, cf. FIG. 2B that the method further includes: sending 110 a third message N3 to the at least one further device 300, third message N3 prompting the at least one further device 300 to initialize an optional watcher unit WT (FIG. 1), which is designed to monitor DLT system 10, for example, repeatedly, for example, periodically for predefinable events, for example, for events relating to state channel SC for device 200. This may be advantageous, for example, if device 200 temporarily has no data connection to device 200', with which it jointly utilizes state channel SC, and is thus unable, for example, to receive any status updates via state channel SC.

In further exemplary specific embodiments, the watcher unit WT is configured, for example, according to the following cited (Reference 3), which is expressly incorporated herewith into the present description.

Patrick McCorry, Surya Bakshi, Iddo Bentov, Sarah Meiklejohn, and Andrew Miller. 2019, "Pisa: Arbitration Outsourcing for State Channels," in Proceedings of the 1st ACM Conference on Advances in Financial Technologies (AFT '19). Association for Computing Machinery, New York, NY, USA, 16-30, DOI:https://doi.org/10.1145/3318041.3355461, (Reference 3).

In further exemplary specific embodiments, it is provided that third message N3 is contained in first message N1, for example, combined with the first message.

In further exemplary specific embodiments, cf. FIG. 2B, it is provided that the method further includes: sending 112 pieces of timing information TI to the at least one further device 300 (FIG. 1), pieces of timing information TI characterizing a time behavior of device 200 with respect to transactions T to be carried out via state channel SC, pieces of timing information TI including, for example, an updating interval, within which device 200 informs, for example, a or the watcher unit WT of a new state. In this way, the at least one further device 300 is able to initialize watcher unit WT temporally matching the updating interval, i.e., to adapt the operation of watcher unit WT to the time behavior of device 200 for carrying out transactions T.

In further exemplary specific embodiments, it is provided that pieces of timing information TI are sent with or after first message N1 to the at least one further device 300.

In further exemplary specific embodiments, cf. FIG. 2B, it is provided that the method further includes: sending 114 pieces of status information ZI that characterize an instantaneous state, for example, to watcher unit WT. In this way, watcher unit WT is able to be informed about an instantaneous state of transactions T via state channel SC and, for example, to adjust its operation accordingly.

In further exemplary specific embodiments, it is provided that the method further includes: sending 116 a fourth message N4 to the at least one further device 300, fourth message N4 prompting the at least one further device 300 to disassemble state channel SC. Thus, the disassembly of state channel SC from the at least one further device 300, for example, for device 200 for carrying out transactions T, may also be carried out, which further relieves device 200 for carrying out transactions T.

Blocks 100 through 116 described by way of example above may also be carried out in a different order in further exemplary specific embodiments. In further exemplary specific embodiments, at least one of blocks 100 through 116 described by way of example above may also be omitted, i.e., not carried out. The same also applies to the methods described by way of example below.

In further exemplary specific embodiments, it is provided that the at least one further device 300 (FIG. 1) is designed to carry out transactions on the DLT system, cf. double arrow A1 from FIG. 1, for example, a) to establish a or the state channel SC for device 200, b) to remove a or the state channel SC for device 200, c) to initialize a or the optional watcher unit WT, for example, based on pieces of timing information TI that characterize the time behavior of device 200 with respect to transactions T to be carried out via state channel SC. The at least one further device 300 may, for example, thereby carry out steps of managing state channel SC and thereby, for example, "relieve" device 200, so that device 200 in further exemplary specific embodiments does not have to maintain the corresponding computing time or other resource expenditure. In this way, the complexity of device 200 for carrying out the transactions in further exemplary specific embodiments may be reduced or its operating life (for example, in a battery operation) may be increased.

A communication of device 300 with optional watcher unit WT is symbolized in FIG. 1 by double arrow A2. A communication of optional watcher unit WT with DLT system 10 is symbolized in FIG. 1 by double arrow A3.

A communication of optional device 200' with optional device 300' WT is symbolized in FIG. 1 by double arrow N1', N2'. A communication of optional device 300' with DLT system 10 is symbolized in FIG. 1 by double arrow A1'.

Further exemplary specific embodiments relate to a device 200 (FIG. 1) for carrying out transactions T via at least one state channel SC associated, for example, with a distributed ledger technology, DLT, system 10, device 200 for carrying out the method being designed according to the specific embodiments.

In further exemplary specific embodiments, it is provided that device 200 is designed as an Internet-of-Things (IoT) device, device 200, for example, being designed to carry out transactions T via, for example, an already existing state channel SC, device 200 not being designed, for example, to directly access a or the DLT system 10. In further exemplary specific embodiments, accesses to DLT system 10, for example, for establishing and/or disassembling state channel SC may be carried out by the at least one further device 300.

In further exemplary specific embodiments, it is provided that device 200 includes at least one sensor unit for ascertaining sensor data. Device 200 may, for example, be designed as an IoT sensor device 200. In further exemplary specific embodiments, IoT device 200 may utilize state channels SC for transactions T, for example, the offering or selling of sensor data, for example, in terms of the Economy-of-Things (EoT), with the aid of the support by the at least one further device 300 with respect to accesses to DLT system 10, IoT sensor device 200 being able to establish and/or disassemble state channels SC, for example, and/or otherwise be managed by the at least one further device 300. In further exemplary specific embodiments, device 200 itself carries out transactions for offering and/or for selling sensor data or, in general, resources, for example by accomplishing so-called commitment transactions via the state channel.

Figure 3:
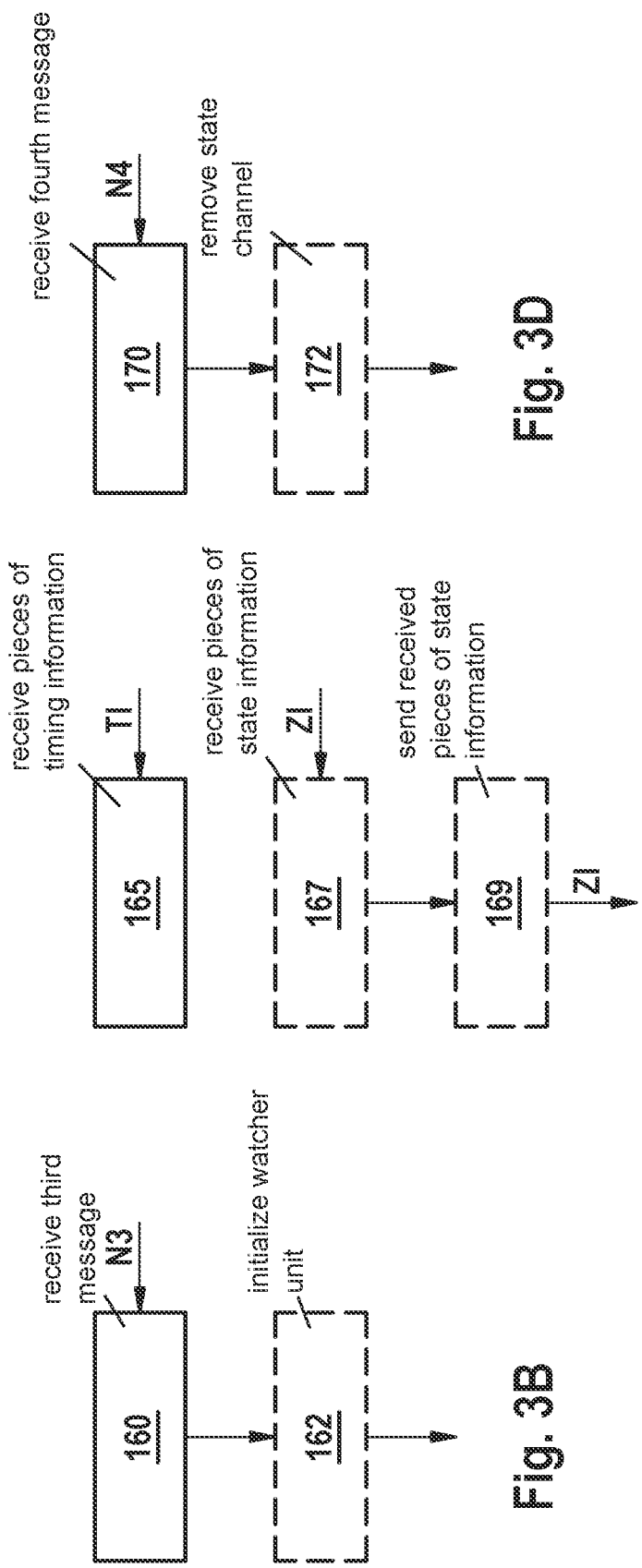
FIG. 3A schematically shows a simplified flowchart of methods according to further exemplary specific embodiments of the present invention.
FIG. 3B schematically shows a simplified flowchart of methods according to further exemplary specific embodiments of the present invention.
FIG. 3C schematically shows a simplified flowchart of methods according to further exemplary specific embodiments of the present invention.
FIG. 3D schematically shows a simplified flowchart of methods according to further exemplary specific embodiments of the present invention.

Further exemplary specific embodiments, cf. FIG. 3A, relate to a method for managing a state channel SC associated, for example, with a distributed ledger technology, DLT, system 10 for at least one device for carrying out transactions T via state channel SC, for example, for at least one device 200, 200' according to the specific embodiments, the method including: receiving 150 a or the first message N1, for example, from device 200 (directly from the device or indirectly, i.e., message N1 may be sent from device 200, for example, also to a gateway, which forwards message N1 to a device 300 for carrying out the method according to FIG. 3A), first message N1 indicating that a state channel SC is to be established for device 200, establishing 152 state channel SC, sending 154 a second message N2 to device 200 (directly or, for example, via a gateway), second message N2 signaling that state channel SC has been established and, for example, may be used henceforth by device 200.

In further exemplary specific embodiments, cf. FIG. 3B, it is provided that the method further includes: receiving 160 a or the third message N3, for example, from device 200, third message N3 indicating that a watcher unit WT is to be initialized, which is designed to monitor DLT system 10, for example, repeatedly, for example, periodically, for predefinable events, for example, for events relating to state channel SC for device 200 and, optionally, initializing 162 watcher unit WT.

In further exemplary specific embodiments, cf. FIG. 3C, it is provided that the method further includes: receiving 165 pieces of timing information TI, for example, from device 200, pieces of timing information TI characterizing a time behavior of device 200 with respect to transactions T to be carried out via state channel SC, pieces of timing information TI including, for example, an updating interval, within which device 200 informs, for example, a or the watcher unit WT of a new state.

In further exemplary specific embodiments, cf. FIG. 3D, it is provided that the method further includes: receiving 167 pieces of state information ZI that characterize an instantaneous state, for example, from device 200 and, optionally, sending 169 received pieces of state information ZI, for example, to watcher unit WT. This eliminates the need for device 200 to send its state information ZI itself to watcher unit WT. In further exemplary specific embodiments, this may thus be carried out instead by device 300.

In further exemplary specific embodiments, cf. FIG. 3D, it is provided that the method further includes: receiving 170 a or the fourth message N4, for example, from device 200, the fourth message N4 indicating that state channel SC is to be disassembled and, optionally, removing 172 state channel SC. This may be accomplished by device 300 carrying out a corresponding transaction on DLT system 10, for example, a so-called settlement transaction.

Further exemplary specific embodiments relate to a device 300, 300' for managing a state channel SC associated, for example, with a or the distributed ledger technology, DLT, system 10 for at least one device for carrying out transactions T via state channel SC, for example, for at least one device 200, 200' according to the specific embodiments, device 300, 300' being designed to carry out the method according to the specific embodiments, cf. FIG. 3A through FIG. 3D. In further exemplary specific embodiments, device 300, 300' for managing the state channel may also manage multiple state channels SC, for example, for a plurality or multitude of (IoT) devices 200, 200' for carrying out transactions via the state channel or state channels, and thus relieve (IoT) devices 200, 200' of comparatively computing-intensive and/or (data) communication-intensive processes such as, for example, the establishment and/or disassembly of state channels SC.

In further exemplary specific embodiments, device 300, 300' for managing state channel SC or a corresponding functionality may be implemented, for example, on a mobile terminal such as, for example, a mobile telephone or laptop computer or also on a stationary device, for example, in the form of a software agent (computer program).

In further exemplary specific embodiments, device 300, 300' for managing state channel SC or a corresponding functionality may be implemented, for example, in the form of a wallet service, i.e., of a service, for example, that stores or manages private cryptographic keys for an access to a DLT system 10.

Further exemplary specific embodiments, cf. FIG. 1, relate to a system 1000 including at least one device 200 for carrying out transactions T according to the specific embodiments and at least one device 300 for managing a state channel SC associated, for example, with a or the distributed ledger technology, DLT, system 10 for at least one device for carrying out transactions, for example, for the at least one device 200 for carrying out transactions T.

In further exemplary specific embodiments, it is provided that system 1000 further includes at least one distributed ledger technology, DLT, system 10.

Figure 4:
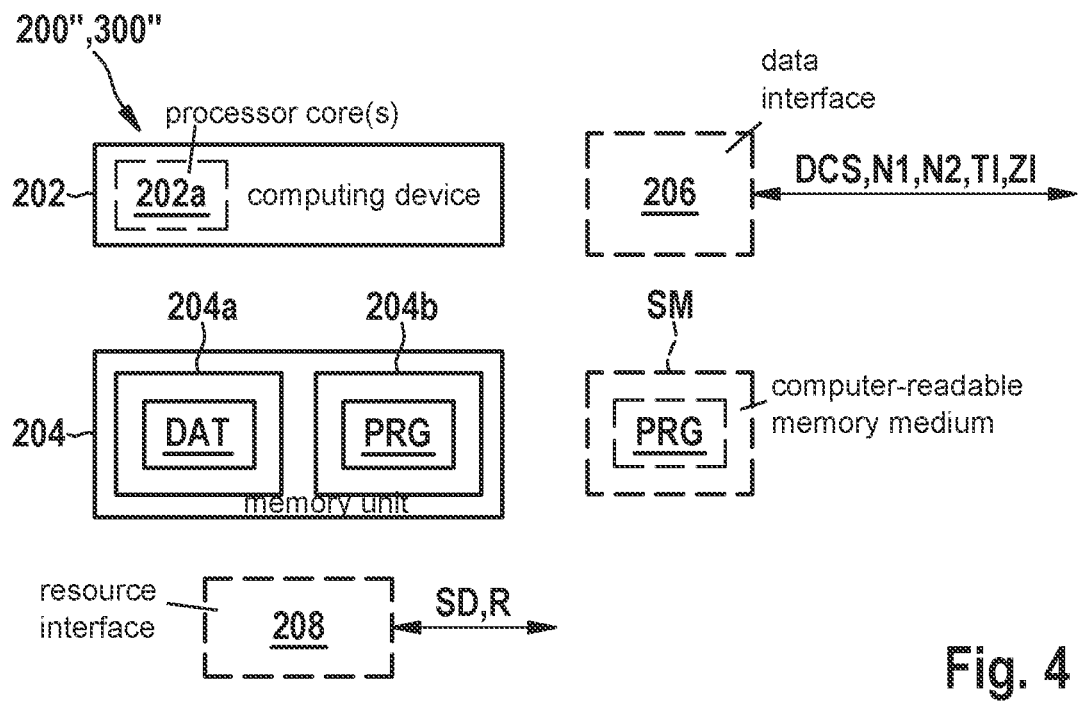
FIG. 4 schematically shows a simplified block diagram according to further exemplary specific embodiments of the present invention.

FIG. 4 schematically shows a simplified block diagram according to further exemplary specific embodiments. A configuration 200" and 300" is depicted, as it may include in further exemplary specific embodiments at least one of devices 200, 200', 300, 300' according to FIG. 1. It should be noted that devices 200, 300 according to further exemplary specific embodiments have, in principle, a structurally comparable design 200", 300", but may in fact potentially differ significantly from one another with respect to, for example, the computing power and/or memory capacity and/or communication bandwidth.

Configuration 200", 300" includes a computing device 202 ("computer") including at least one processor core 202a, a memory unit 204 assigned to computing device 202 for storing at least temporarily at least one of the following elements: a) data DAT, b) computer program PRG, in particular, for carrying out the method according to the specific embodiments.

In further preferred specific embodiments, data DAT may include at least temporarily and/or partially data of transactions T, in the case of device 200", for example, data of commitment transactions T via state channel SC, and in the case of device 300", for example, data of funding transactions or anchor transactions for establishing a state channel SC and/or of settlement transactions for disassembling a state channel SC.

In further preferred specific embodiments, memory unit 204 includes a volatile memory 204a (for example, working memory (RAM), and/or a non-volatile memory 204b (for example, flash EEPROM).

In further exemplary specific embodiments, computing device 202 may include at least one of the following elements: microprocessor μP, microcontroller μC, application-specific integrated circuit (ASIC) system on chip (SoC) programmable logic module (for example, FPGA, field programmable gate array), hardware circuitry, graphic processor (GPU, graphics processing unit), or arbitrary combinations thereof.

Further exemplary specific embodiments relate to a computer-readable memory medium SM, including commands PRG which, when executed by a computer 202, prompt the computer to carry out the method according to the specific embodiments.

Further exemplary specific embodiments relate to a computer program PRG, including commands which, when executed by a computer 202, prompt the computer to carry out the method according to the specific embodiments.

Further exemplary specific embodiments relate to a data carrier signal DCS, which characterizes and/or transfers computer program PRG according to the specific embodiments. Data carrier signal DCS is receivable, for example, via an optional data interface 206 of device 200, via which in further exemplary specific embodiments, for example, one or multiple of messages N1, N2 or pieces of information TI, ZI are transferable, and/or other, for example, pieces of information conveyable or to be conveyed via state channel SC, and in the case of device 300", for example, also pieces of information transferable between device 300" and DLT system 10 (see for example, double arrow A1 from FIG. 1) and/or pieces of information transferable between device 300" and watcher unit WT (see for example double arrow A2 from FIG. 1).

In further preferred specific embodiments, device 200" includes an optional resource interface 208 for providing resource(s)R, which, for example, may include a sensor unit or may be designed as sensor unit 208. In this example, device 200 may therefore sell its sensor data SD to a further device 200' via state channel SC, for example, within the scope of commitment transactions T.

In further preferred specific embodiments, a certain amount of a currency or a piece of information characterizing this amount may, in return for sensor data SD, be transferred by buyer 200' of sensor data SD, for example, also with the aid of commitment transactions T via state channel SC, the transfer being able to also take place in the form of so-called micropayments. In this way, sensor data SD in further exemplary specific embodiments may be traded or sold with a comparatively small granularity (for example, individual sensor data values in exchange for a comparatively small payment).

In further exemplary specific embodiments, alternatively or in addition to the information characterizing the currency or the type of currency, a piece of information may also be used for the payment and, for example, may be contained in smart contract 14 associated with state channel SC, which characterizes at least one of the following elements: asset or asset value, cost, money, crypto-currency, promissory notes, vouchers, etc.

Figure 5:
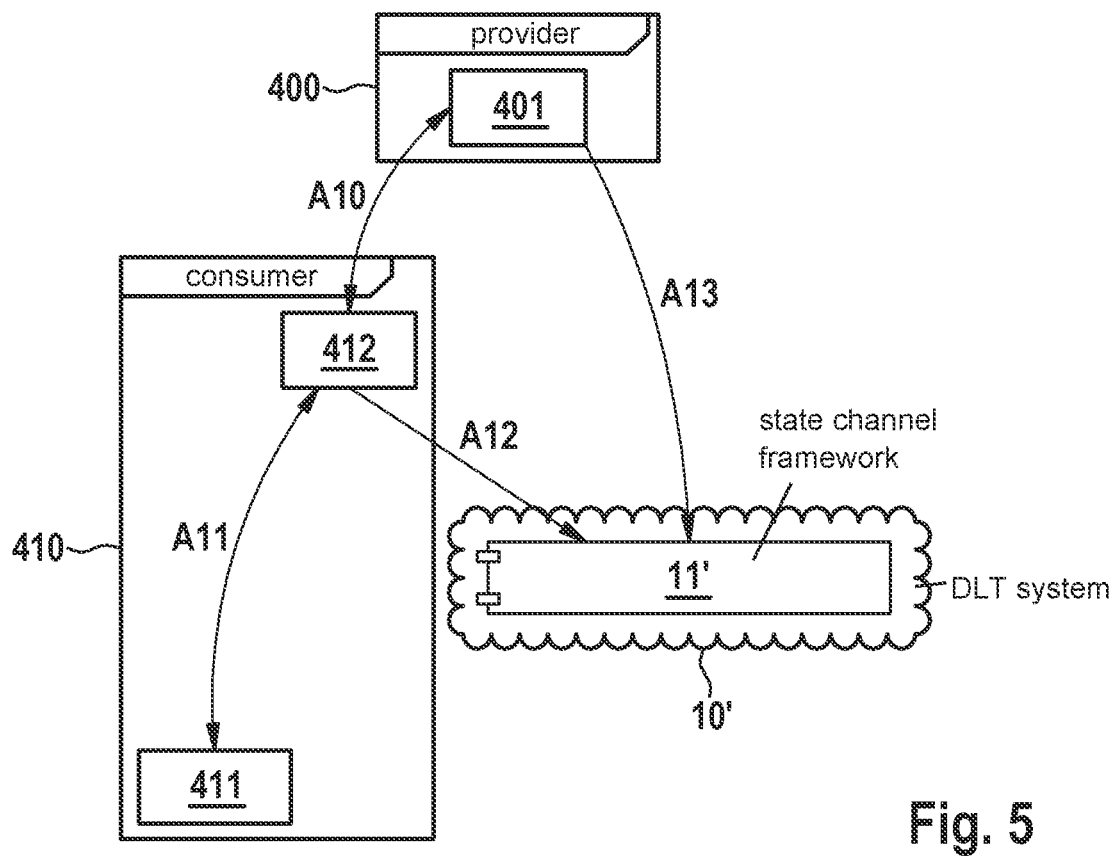
FIG. 5 schematically shows a simplified block diagram according to further exemplary specific embodiments of the present invention.

FIG. 5 schematically shows a simplified block diagram according to further exemplary specific embodiments. Two parties 400, 410 are depicted, which may be, for example, a provider 400 of a resource and a prospective consumer 410 of the resource. The resource may, for example, be electrical energy.

Provider 400 is assigned a device 401, which is able to communicate with DLT system 10', cf. double arrow A13, as well as—for example, outside DLT system 10', i.e., off-chain-directly (or via a gateway, not shown) with consumer 410 or with at least one component 412 of consumer 410, cf. double arrow A10.

In further exemplary specific embodiments, consumer 410 is assigned a device 411, which corresponds with respect to its function at least partially to device 200 according to the specific embodiments described by way of example above. Device 411 communicates with a further device 412 of consumer 410, cf. double arrow A11, which corresponds with respect to its function, for example, at least partially to device 300 according to the specific embodiments described by way of example above. Via communication A11, device 411 is able to exchange, for example, messages N1, N2, N3, N4 or pieces of information TI, ZI with further device 412 of consumer 410 and, for example, to prompt further device 412 of consumer 410 to establish a state channel for a direct exchange, for example, of commitment transactions, for example, with device 401 of provider 400, cf. double arrow A10. For this purpose, further device 412 of consumer 410 may, for example, enter into a data communication with DLT system 10', cf. double arrow A12. In further exemplary specific embodiments, DLT system 10' is assigned a state channel framework 11', which makes it possible, for example, to manage (for example, establish, disassemble, etc.) state channels, for example, in the sense of [Reference 2].

On the whole, both parties 400, 410 in further exemplary specific embodiments are able to carry out both on-chain transactions A12, A13, i.e., transactions with DLT system 10', for example, funding transactions or anchor transactions and/or settlement transactions, as well as off-chain transactions A10, for example, commitment transactions.

FIG. 6 schematically shows a simplified block diagram according to further exemplary specific embodiments, in which both parties 400, 410 are able to carry out both on-chain transactions A21, A23, A24 as well as off-chain transactions A22. The data exchange according to double arrow A22 corresponds in this case, for example, to off-chain transactions (for example, of the commitment type) via a state channel, as it is establishable by device 402 (for example, similar or identical to device 300 according to FIG. 1) for device 401 (for example, similar or identical to device 200 according to FIG. 1).

In further exemplary specific embodiments, device 411 is comparable, for example, with device 200 or 200' according to FIG. 1, i.e., for example, designed at least identically or at least similarly to device 200 or 200' according to FIG. 1.

In further exemplary specific embodiments, device 413 is comparable, for example, with device 300 or 300' according to FIG. 1, i.e., for example, designed identically or at least similarly to device 300 or 300' according to FIG. 1. In further exemplary specific embodiments, device 413 may also have the functionality of a wallet service, i.e., of a service which stores or manages, for example, private cryptographic keys for an access to a DLT system 10'.

In further exemplary specific embodiments, party 410 is assigned an optional gateway 414, which accepts, for example, messages from device 411, for example, N1-type messages (request establishment of a state channel for device 411 to device 413), and forwards this, for example, to device 413, which establishes, for example, state channel for device 411. For example, gateway 414 may also receive N2-type messages (information, that state channel is established) from device 413 and forward them onto device 411. In a similar manner, gateway 414 in further exemplary specific embodiments may also exchange and forward further or other messages between at least two of devices 411, 413, 415.

In further exemplary specific embodiments, party 410 is assigned an optional watcher unit 415, which is able, for example, to observe DLT transactions of DLT system 10', for example, for device 411. In further exemplary specific embodiments, a data exchange may take place between optional watcher unit 415 and device 411 also via gateway 414.

Figure 7A:
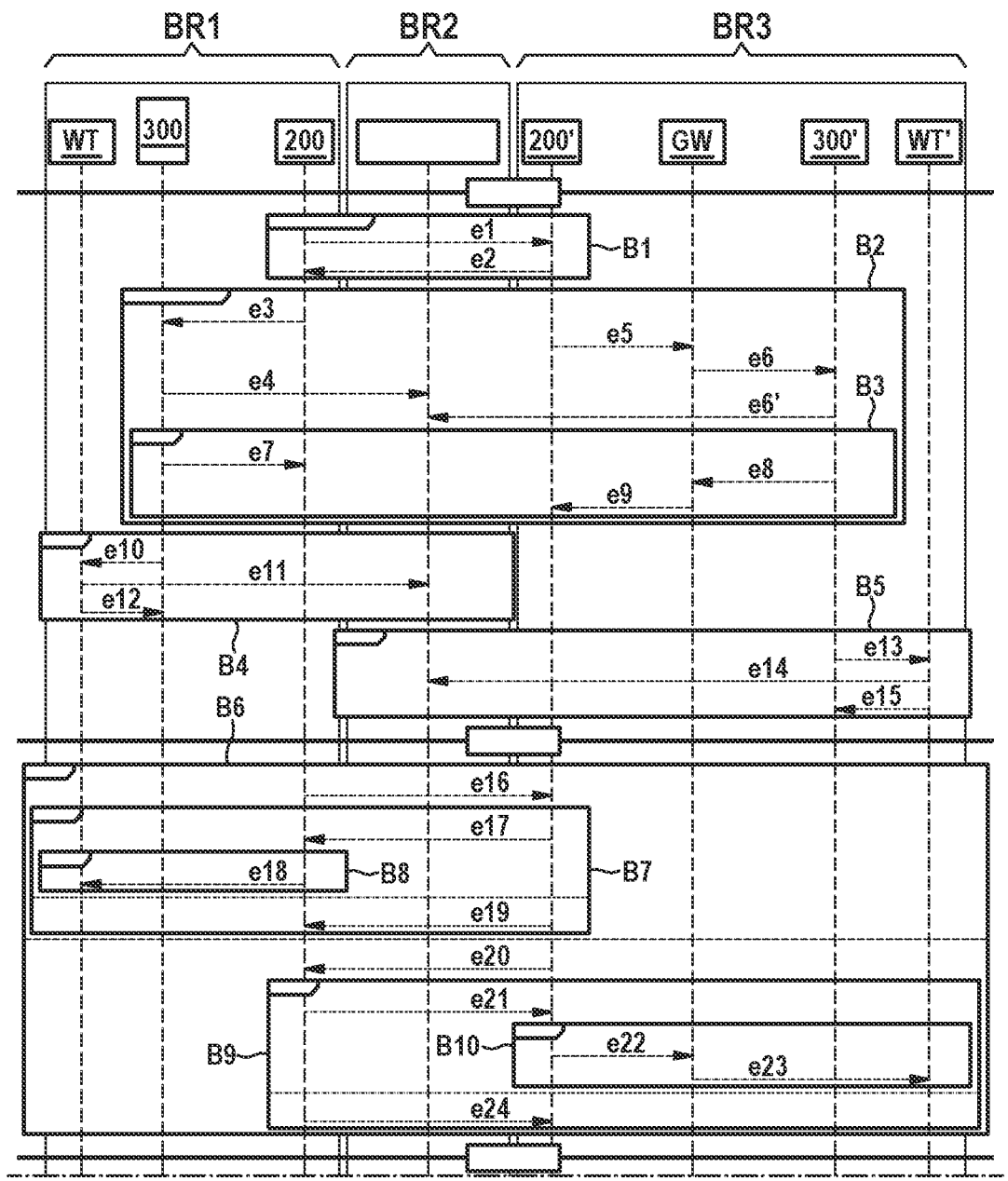
FIG. 7A schematically shows a simplified flowchart according to further exemplary specific embodiments of the present invention.

FIG. 7A schematically shows a simplified block diagram according to further exemplary specific embodiments, area BR1 being able to be assigned to a first party (for example, to a consumer), area BR2 being able to be assigned, for example, to a DLT system 10 (FIG. 1) or to an optional, associated state channel framework (for example, according to [Reference 2]), and area BR3 being able to be assigned, for example, to a second party (for example, to a provider of resources).

In further exemplary specific embodiments, consumer BR1 is assigned one or multiple of the following elements:
a) a device 200 for carrying out transactions T (FIG. 1) on a state channel SC, for example, an IoT device 200,
b) a device 300 for managing a state channel SC associated, for example, with a DLT system 10 for device 200,
c) a watcher unit WT.

In further exemplary specific embodiments, provider BR3 is assigned one or multiple of the following elements:
a) a device 200' for carrying out transactions T (FIG. 1) on a state channel SC, for example, an IoT device 200',
b) a device 300' for managing a state channel SC for device 200' associated, for example, with a DLT system 10, device 300' also being able to have the function of a wallet service,
c) a watcher unit WT',
d) a gateway GW.

In further exemplary specific embodiments, block B1 symbolizes an initialization or negotiation 100 (cf. FIG. 2A) of an initial state, for example, reaching an agreement between devices 200, 200', which is characterizable, for example, with the aid of a digital contract, for example, with the aid of a smart contract 14 (FIG. 1), which in further exemplary specific embodiments, for example, is also anchorable in DLT system 10, for example, by carrying out a corresponding anchor transaction, for example, by at least one of devices 300, 300'. Negotiation 100 is undertaken by devices 200, 200' in further exemplary specific embodiments off-chain, i.e., for example, with no transactions with DLT system 10, cf. arrows e1, e2, arrow e1 symbolizing, for example, a message with the aid of which an initial state is generated or communicated to device 200', and arrow e2 symbolizing, for example, a message with the aid of which the initial state is confirmed by device 200'.

In further exemplary specific embodiments, block B2 symbolizes a process for generating a state channel SC (FIG. 1). Device 200 sends a message e3, which corresponds, for example to message N1 according to FIGS. 1, 2A, to device 300 in order to prompt device 300 to establish a state channel SC for device 200. Arrow e4 symbolizes the initialization or establishment of state channel SC for device 200 by device 300.

In further exemplary specific embodiments, device 200' may alternatively or in addition also prompt device 300' to establish a or the state channel SC for transactions T with device 200 for device 200', device 200' sending a corresponding message e5 to gateway GW, which forwards the message in the form of message e6 to device 300'. Arrow e6' symbolizes the initialization or establishment of state channel SC for device 200' by device 300'.

In further exemplary specific embodiments, device 300 sends a message e7 (for example, corresponding to message N2 according to FIGS. 1, 2*a*) to device 200' in block B3 after establishing e4 state channel SC.

In further exemplary specific embodiments, device 300' sends a message e8, e9 (for example, corresponding to message N2 according to FIGS. 1, 2A) via gateway GW to device 200' in block B3 after establishing e6' of state channel SC.

In further exemplary specific embodiments, device 300 initializes, cf. arrow e10, in block B4 optional watcher unit WT for monitoring e11 transactions of DLT system 10 with respect to state channel SC, watcher unit WT confirming this to device 300, for example, with the aid of message e12. In further exemplary specific embodiments, device 300 may communicate with the aid of message e10 of watcher unit WT pieces of timing information TI (cf. FIG. 3C) to device 200, which it has potentially obtained previously (for example, together with message e3 (FIG. 7A)) from device 200. In this way, watcher unit WT is able to coordinate its operation, for example, its temporal behavior when monitoring DLT transactions to DLT system 10 with the temporal operating behavior of device 200.

In further exemplary specific embodiments, a further watcher unit WT' may be initialized in block B5, comparable to block B4, this time in sphere BR3 of the provider, cf. arrow e13, for example, in order to monitor e14 for device 200' DLT transactions on DLT system 10, which have a connection to state channel SC, via which device 200' carries out transactions with device 200. Watcher unit WT' is able to confirm its initialization of device 300', for example, with the aid of message e15.

In further exemplary specific embodiments, transactions may be carried out in block B6, for example, off-chain transactions, i.e., for example, directly between devices 200, 200', for example, commitment transactions which, for example, characterize the proposal e16 and/or acceptance e17 of a new state.

In further exemplary specific embodiments, a message e18 (see also block B8) may be sent from device 200 to watcher unit WT in block B7, which is associated with acceptance e17 of a new state, in order to inform watcher unit WT about this new state accepted by device 200'. With this knowledge, possibly a further DLT transaction ascertained by watcher unit WT, for example, may be appropriately assessed by the watcher unit WT (for example, the state characterized by the DLT transaction may be assessed as correct, if it corresponds to the state communicated by device 200 also accepted by device 200').

Alternatively, device 200' in further exemplary specific embodiments may reject a new state proposed by device 200, cf. arrow e19.

In further exemplary embodiments, arrow e20 symbolizes the proposal of a new state by device 200'.

In further exemplary specific embodiments, device 200 may accept in block B9 the new state proposed by device 200' with the aid of message e20, cf. arrow e21, device 200' informing device 300' with the aid of messages e22, e23 via the gateway about acceptance e21, cf. block B10.

Alternatively, device 200 in further exemplary embodiments may reject a new state proposed by device 200', cf. arrow e24.

Figure 7B:
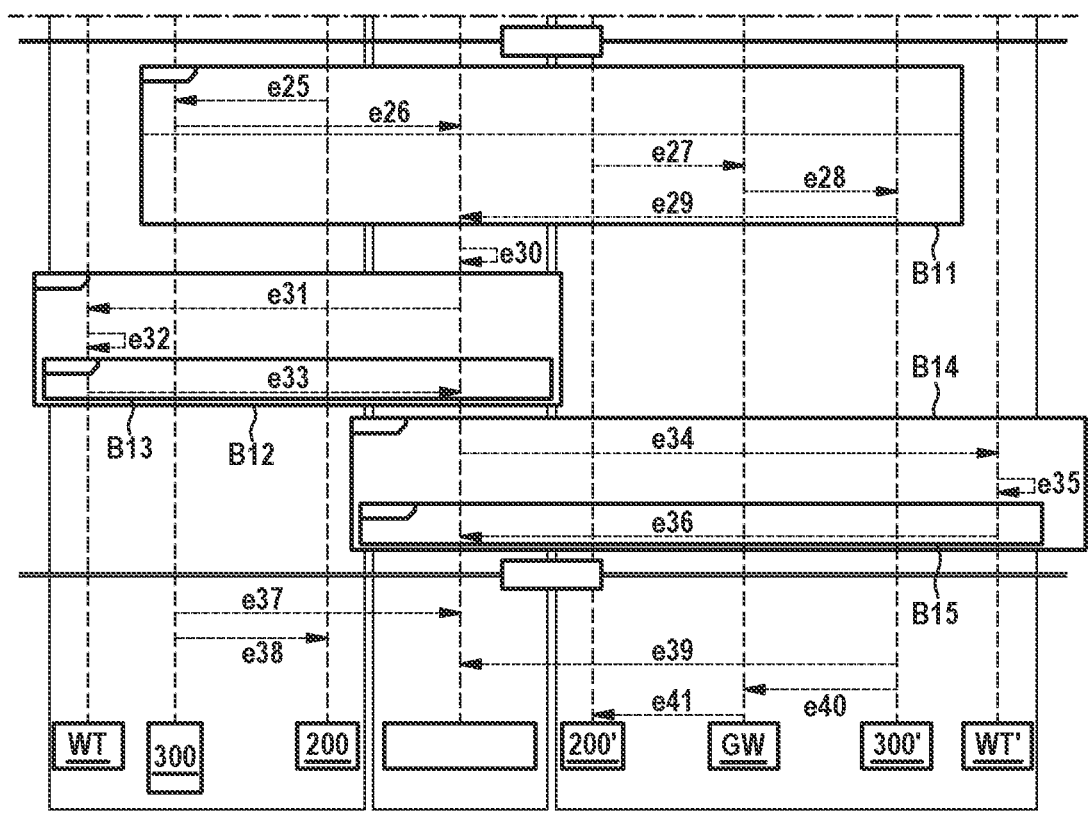
FIG. 7B schematically shows a simplified flowchart according to further exemplary specific embodiments of the present invention.

In further exemplary specific embodiments, for example, in block B11, cf. FIG. 7B, state channel SC (FIG. 1) since utilized by devices 200, 200' for off-chain transactions e16, e17, e19, e20, e21, e24, may be disassembled, for example, by device 300, cf. arrow e26 and/or by device 300', cf. arrow e29, for example, by carrying out one or multiple so-called settlement transactions in DLT system 10. Devices 300 and/or 300' in further exemplary specific embodiments may be prompted by device 200 or 200' for disassembly of the state channel (similar to message N4 according to FIG. 2B), cf. arrows e25, or e27, e28.

In further exemplary specific embodiments, a challenge period is started by the disassembly of state channel SC, cf. arrow e30. Within the challenge period, it is possible to contest the state characterized by settlement transaction(s) e26, e29, for example, if at least one party is of the opinion that the state characterized by settlement transaction(s) e26, e29 is not correct, for example, due to manipulation by one of the parties.

In further exemplary specific embodiments, watcher unit WT, once it has obtained a piece of information e31 (cf. block B12) about disassembly e26, e29 of state channel SC, checks whether the state characterized by settlement transaction(s) e26, e29 is correct, for example, by a comparison with the pieces of information obtained via message e18 (FIG. 7A).

If, for example, watcher unit WT has knowledge about a more up-to-date (i.e., temporally more recent) state, watcher unit WT may register this more up-to-date state in block B13 in DLT system 10, cf. arrow e33.

In further exemplary specific embodiments, watcher unit WT', for example, cf. block B14, arrow e35, once it has obtained a piece of information e34 about registration e33 of the more up-to-date state by watcher unit WT, checks whether the more up-to-date state is correct, for example, by a comparison with the pieces of information obtained via message e22, 23 (FIG. 7A).

If watcher unit WT' considers the more up-to-date state to be valid, it may in turn register this more up-to-date state in DLT system 10, cf. arrow e36 of block B15 and thus, for example, quasi confirm the validity of the more up-to-date state.

In further exemplary specific embodiments, device 300 closes state channel SC, cf. arrow e37, and informs optionally device 200 thereof, cf. arrow e38.

In further exemplary specific embodiments, device 300' closes state channel SC, cf. arrow e39, and informs optionally device 200' thereof, cf. arrows e40, e41.

Figure 8:
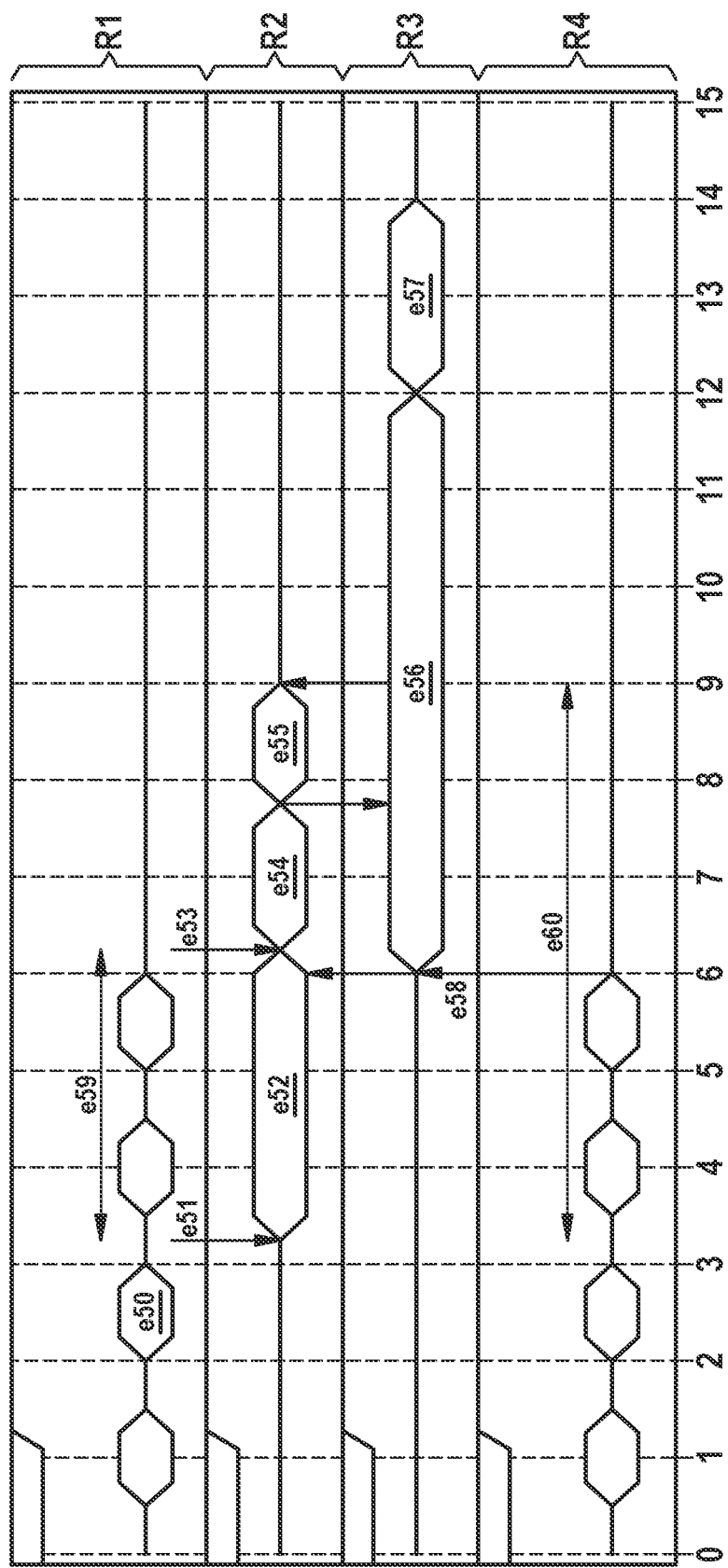
FIG. 8 schematically shows a simplified time diagram according to further exemplary specific embodiments of the present invention.

FIG. 8 schematically shows a simplified time diagram according to further exemplary specific embodiments. Depicted in area R1 are transactions, for example, commitment transactions associated with device 200 (FIGS. 1, 7A, 7B), in the present case four transactions, one of which is identified with reference numeral e50.

In area R2, processes associated with watcher unit WT are depicted, arrow e51 symbolizing that device 200 informs watcher unit WT of a new state e50. Watcher unit WT in further exemplary specific embodiments thereupon starts a monitoring e52 of DLT system 10.

In further exemplary specific embodiments, arrow e53 symbolizes that device 200 again informs watcher unit WT of a new state, whereupon, for example, the monitoring of DLT system 10 is continued by watcher unit WT, cf. reference numeral e54. Watcher unit WT then issues the new state in block e55.

A challenge period e56 is symbolized in area R3, cf. also arrow e30 from FIG. 7A, and a following execute-period e57 in which the instantaneous state is carried out or confirmed, for example, also by a transaction with DLT system 10 (FIG. 1). In area R4, similar to area R1, transactions not identified individually, associated with device 200' (FIG. 1, 7A, 7B), for example, commitment transactions, are depicted, in the present case, for example, four transactions. Arrow e58 symbolizes an issue of a new state via state channel SC, which launches previously described challenge period e56.

In further exemplary specific embodiments, double arrow e59 symbolizes an updating interval of device 200, and double arrow e60 symbolizes a time span, which corresponds to a sum of updating interval e59, monitoring e54 and issue e55. In further preferred specific embodiments, time span e60 is shorter than challenge period e56, which ensures that a reliable resolution of conflicts is possible even in the case of an at least temporarily interrupted data link of device 200. Thus, in further exemplary specific embodiments, it is achievable that a closing of a state channel (including, for example, settlement and conflict resolution) does not violate security guarantees of a protocol for the transactions via state channel SC, even in such configurations or environments, in which devices 200, 200' have, for example, only a restricted data link to one another.

In further exemplary specific embodiments, variables characterizing a time behavior of components of system 1000 (FIG. 1) are:
a) a challenge period CP: time in which a party (for example, device 200) may respond to a state S(n) proposed, for example, with the aid of a commitment transaction. The challenge period in further exemplary specific embodiments may be used, for example, in a case of conflict, to issue a more up-to-date state S(m), where m>n.
b) an updating interval AI: time interval of a device 200, at which device 200 informs an optional watcher unit WT of a new state, cf., for example, arrow e18 from FIG. 7A. For example, the updating interval may be comparatively long in the case of IoT devices 200 having poor or intermittent connectivity or having a limited electrical power supply, because more frequent data communications, for example, are not possible or are not practical due to temporary energy saving conditions.
c) monitoring interval M: monitoring interval M of a watcher unit WT, WT', in which the watcher unit is informable, for example, about a new state and is designed to respond, for example, to a new state or events of DLT system 10 with respect to a state channel SC,
d) issue interval P(W): time interval for watcher unit WT, WT' in order to issue the last known state in the event of a conflict.

In further exemplary specific embodiments, the aforementioned variables CP, AI, M, P(W) are coordinated with one another in such a way that the following condition is met:

AI+M+P(W)<CP, which is also illustrated by way of example by FIG. 8 described above.

Figure 9:
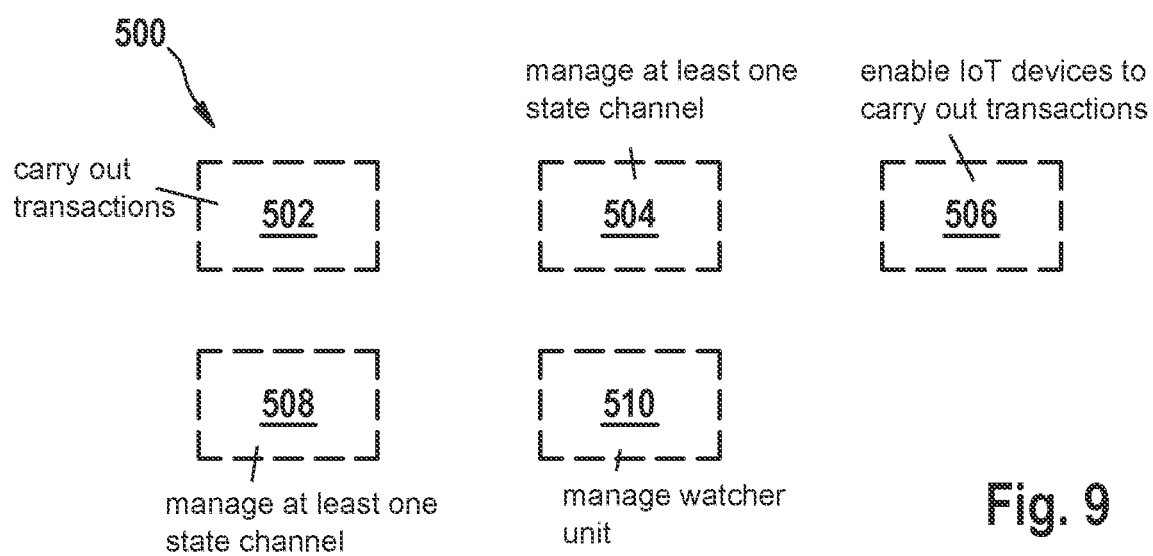
FIG. 9 schematically shows aspects of uses according to further exemplary specific embodiments of the present invention.

Further exemplary specific embodiments, cf. FIG. 9, relate to a use 500 of the method according to the specific embodiments and/or of the device according to the specific embodiments and/or of the system according to the specific embodiments and/or of the computer-readable memory medium according to the specific embodiments and/or of the computer program according to the specific embodiments and/or of the data carrier signal according to the specific embodiments for at least one of the following elements: a) carrying out 502 transactions T, for example, off-chain transactions, via at least one state channel SC associated, for example, with a distributed ledger technology, DLT, system 10, b) managing 504 at least one state channel SC associated, for example, with a DLT system 10, c) enabling 506, Internet-of-Things, IoT, devices 200, 200' to carry out transactions T, for example, Economy-of-Things, EoT transactions via at least one state channel SC, d) managing 508 at least one state channel SC associated, for example, with a DLT system 10 for at least one IoT device 200, 200', e) managing 510 a watcher unit WT, WT' for at least one device 200, 200' for carrying out transactions T via at least one state channel SC associated, for example, with a DLT system 10, for example, for at least one IoT device 200, 200'.

Further exemplary specific embodiments enable a separation of the management (for example, establishment, disassembly) of state channels SC from the execution of transactions T via state channels SC, for example, in a physical and/or logical sense. Thus, for example, device 300 is usable for the DLT communication, as it is usable, for example, for the establishment and disassembly of state channels SC, whereas device 200 carries out transactions T via the state channel or channels SC. This enables, for example, such devices 200 having comparatively low computing resources or memory resources or communication resources to be able to participate in or utilize protocols, for example, second layer protocols, i.e., for example, protocols for state channels SC, for example, for peer-to-peer transaction T, for example, between devices 200, 200', whereas they need not be concerned with a DLT communication, because this is carried out, for example, by device 300, 300'. Further exemplary specific embodiments enable, in particular, the guarantees with regard to security and confidentiality enabled by second layer protocols to also be obtained or provided for off-chain transactions T of devices 200, 200', even though, for example, devices 200, 200' do not communicate with DLT system 10.

Further exemplary specific embodiments and applications are described below, each of which are combinable individually and/or in combination with one another with one or multiple of the specific embodiments described by way of example above.

In further exemplary specific embodiments, a party 400, 410 (FIG. 5) may be an operator of a charging station or charging infrastructure for charging electrical energy stores, which has multiple charging stations, for example. In further exemplary specific embodiments, one other party may represent an owner of a vehicle fleet or also an owner or driver of a vehicle.

In order to establish a state channel, for example, for the electrical charging, the vehicle to which, for example, device 200 (FIG. 1) is assigned, and the charging station, to which, for example, device 200' is assigned negotiate an initial state, cf., for example, also optional step 100 from FIG. 2A and/or arrows e1, e2 from FIG. 7A. In further exemplary specific embodiments, devices 200, 200' send the initial state, for example, characterized by a digital contract 14, to a respective further device 300, 300' (cf. for example arrows e3, e5, e6 from FIG. 7A), which are provided, for example, for establishing a state channel for devices 200, 200'.

If state channel SC has been initiated by all participating parties (arrow e4, e6'), device 200, 200' are informed thereof (arrow e7, e8, e9), which now are able to carry out transactions T via state channel SC.

If, as expected, the charging takes a longer period of time, for example, of several hours, the automobile or the charging station in further exemplary specific embodiments may accordingly update a watcher unit WT, WT', for example, repeatedly, for example, periodically, for example, every 30 minutes with the aid of their respective device 200, 200' (updating interval AI is accordingly 30 minutes, for example), which reduces a connectivity to be provided or to be used by devices 200, 200' and thus saves resources (for example, bandwidth, power). On this basis (updating interval AI=30 min), the challenge period is set in further exemplary specific embodiments to >30 minutes.

Further exemplary specific embodiments relate to applications in the field of share economy. The principle of share economy is based on the concept that products such as, for example, tools, for example, power tools (for example, power drills) are loaned out and that a user fee is paid for the lending period.

At a lending station for the power tools, for example, the terms for lending the power drill are negotiated, for example, payment per period of use, maximum period of use, lending period, etc.), cf. optional step 100 from FIG. 2A and/or arrows e1, e2 from FIG. 7A. A state channel SC is subsequently established between devices 200, 200', which is assigned, for example, to the user or borrower and the power drill, or to the lender, for example, by corresponding further devices 300, 300'. Direct payments for predefinable or negotiated periods of use, for example, may be made via state channel SC, a local hardwired and/or wireless communication protocol for state channel SC, for example, being usable for a corresponding, for example, peer-to-peer data transmission between devices 200, 200'.

In order to save electrical power of the borrowed power drill, it may be provided in further exemplary specific embodiments that it includes a restricted data communication, for example, once every 24 hours, for example, for conveying a new state. In further exemplary specific embodiments, therefore, it may be provided to establish the challenge period at >24 hours. In further exemplary specific embodiments, the challenge period may, for example, also be dynamically (during the existence of state channel SC) adapted, i.e., prolonged or shortened. If, for example, it is expected that device 200' of the power drill is offline for a longer period (with no data link), for example, for a week or for the entire stipulated lending period (for example, due to a use at a construction site with no communications capabilities for device 200'), the challenge period may be increased accordingly, for example, to over a week.

What is claimed is:

1. A computer-implemented method for operating a device which is configured to carry out transactions via at least one state channel associated with a distributed ledger technology (DLT) system, the method comprising the following steps:
    sending, by the device, a first message to at least one further device, the first message prompting the at least one further device to establish, via transactions carried out by the at least one further device on the DLT system, a state channel for the device between the device and a third device, the third device being separate from the device and the at least one further device;
    receiving, by the device, a second message from the at least one further device, the second message signaling that the state channel between the device and the third device has been established for the device; and
    carrying out at least one transaction between the device and the third device via the state channel.

2. The method as recited in claim 1, further comprising:
    establishing, by the device, an initial state for future transactions via the state channel, the first message being formed based on the initial state.

3. The method as recited in claim 1, further comprising:
    sending, by the device, a third message to the at least one further device, the third message prompting the at least one further device to initialize a watcher unit, which is configured to monitor the DLT system for predefinable events relating to the state channel for the device.

4. The method as recited in claim 3, wherein the third message is contained in the first message.

5. The method as recited in claim 3, further comprising:
    sending, by the device, pieces of timing information to the at least one further device, the pieces of timing information characterizing a time behavior of the device with respect to transactions to be carried out via the state channel, the pieces of timing information including an updating interval within which the device informs the watcher unit of a new state.

6. The method as recited in claim 5, wherein the pieces of timing information are sent with or after the first message to the at least one further device.

7. The method as recited in claim 3, further comprising:
    sending, by the device, pieces of state information, which characterize an instantaneous state to the watcher unit.

8. The method as recited in claim 1, further comprising:
    sending, by the device, a fourth message to the at least one further device, the fourth message prompting the at least one further device to disassemble via transactions carried out by the at least one further device on the DLT system, the state channel.

9. The method as recited in claim 3, wherein the at least one further device is configured to carry out transactions on the DLT system: a) to establish the state channel for the device, b) to disassemble the state channel for the device, c) to initialize the watcher unit based on pieces of timing information that characterize a time behavior of the device with respect to transactions to be carried out via the state channel.

10. A device for carrying out transactions via at least one state channel associated with a distributed ledger technology (DLT) system, the device including at least hardware and being configured to:
    send, by the device, a first message to at least one further device, the first message prompting the at least one further device to establish, via transactions carried out by the at least one further device on the DLT system, a state channel for the device between the device and a third device, the third device being separate from the device and the at least one further device;
    receive, by the device, a second message from the at least one further device, the second message signaling that the state channel between the device and the third device has been established for the device; and
    carry out, by the device, at least one transaction via the state channel between the device and the third device.

11. The device as recited in claim 10, wherein the device is an Internet -of-Things device, the device being configured to carry out transactions via an already existing state channel, the device not being capable of directly accessing the DLT system.

12. The device as recited in claim 10, wherein the device includes at least one sensor unit configured to ascertain sensor data.

13. A method for managing a state channel associated with a distributed ledger technology (DLT) system for at least one device for carrying out transactions via the state channel, the method comprising the following steps:
    receiving, by a further device, a first message from the device, the first message indicating that a state channel is to be established for the device between the device and a third device, the third device being separate from the device and the further device;
    establishing, by the further device, the state channel for the device between the device and the third device, via transactions carried out by the at least one further device on the DLT system; and
    sending, by the further device, a second message to the device, the second message signaling that the state channel between the device and the third device has been established.

14. The method as recited in claim 13, further comprising:
    receiving, by the further device, a third message from the device, the third message indicating that a watcher unit is to be initialized, which is configured to monitor the DLT system repeatedly for predefinable events relating to the state channel for the device; and
    initializing, by the further device, the watcher unit.

15. The method as recited in claim 14, further comprising:
    receiving, by the further device, pieces of timing information from the device, the pieces of timing information characterizing a time behavior of the device with respect to transactions to be carried out via the state channel, the pieces of timing information including an updating interval within which the device informs the watcher unit of a new state.

16. The method as recited in claim 14, further comprising:
receiving, by the further device, pieces of state information, which characterize an instantaneous state from the device; and
sending, by the further device, the received pieces of state information to the watcher unit.

17. The method as recited in claim 13, further comprising:
receiving, by the further device, a fourth message from the device, the fourth message indicating that the state channel between the device and the third device is to be disassembled; and
disassembling, by the further device, the state channel between the device and the third device, via transactions carried out by the further device on the DLT system.

18. A further device for managing a state channel associated with a distributed ledger technology (DLT) system for at least one device for carrying out transactions via the state channel for at least one device, the further device for managing including at least hardware, and being configured to:
receive, by the further device, a first message from the device, the first message indicating that a state channel is to be established for the device between the device and a third device, the third device being separate from the device and the further device;
establish, by the further device, the state channel between the device and the third device, via transactions carried out by the further device on the DLT system; and
send, by the further device, a second message to the device, the second message signaling that the state channel between the device and the third device has been established.

19. A system comprising:
a device for carrying out transactions via at least one state channel associated with a distributed ledger technology (DLT) system, the device for carrying out the transactions, including at least hardware and being configured to:
send, by the device, a first message to at least one further device, the first message prompting the at least one further device to establish, via transactions carried out by the at least one further device on the DLT system, a state channel for the device between the device and a third device, the third device being separate from the device and the at least one further device, and
receive, by the device, a second message from the at least one further device, the second message signaling that the state channel between the device and the third device has been established for the device; and
the at least one further device for managing the state channel, the at least one further device including at least hardware, and being configured to:
receive, by the at least one further device, the first message from the device, the first message indicating that the state channel is to be established for the device,
establish, by the at least one further device the state channel for the device between the device and the third device, via transactions carried out by the at least one further device on the DLT system, and
send, by the at least one further device, the second message to the device, the second message signaling that the state channel between the device and the third device has been established.

20. The system as recited in claim 19, further comprising: the DLT system.

21. A non-transitory computer-readable memory medium on which are stored commands for operating a device which is configured to carry out transactions via at least one state channel associated with a distributed ledger technology (DLT) system, the commands, when executed by a computer, causing the computer to perform the following steps:
sending, by the device, a first message to at least one further device, the first message prompting the at least one further device to establish, via transactions carried out by the at least one further device on the DLT system, a state channel for the device between the device and a third device, the third device being separate from the device and the at least one further device;
receiving, by the device, a second message from the at least one further device, the second message signaling that the state channel between the device and the third device has been established for the device; and
carrying out at least one transaction between the device and the third device via the state channel.

22. A non-transitory computer-readable memory medium on which are stored commands for managing a state channel associated with a distributed ledger technology (DLT) system for at least one device for carrying out transactions via the state channel, the commands, when executed by a computer, causing the computer to perform the following steps:
receiving, by a further device, a first message from the device, the first message indicating that a state channel is to be established for the device between the device and a third device, the third device being separate from the device and the further device;
establishing, by the further device, the state channel for the device between the device and the third device, via transactions carried out by the at least one further device on the DLT system; and
sending, by the further device, a second message to the device, the second message signaling that the state channel between the device and the third device has been established.

23. The method as recited in claim 1, wherein the method is used to carry out off-chain transactions via the state channel associated with the DLT system.

24. The method as recited in claim 13, wherein the method is used for at least one of the following: a) managing the state channel associated with the DLT system, b) enabling Internet-of-Things (IOT) devices to carry out transactions via the state channel, c) managing the state channel associated with the DLT system for at least one IoT device, d) managing a watcher unit for at least one device for carrying out transactions via the state channel associated with the DLT system.

* * * * *